C. T. MOSS.
WHEEL GUARD OR FENDER.
APPLICATION FILED MAY 5, 1908.
904,980.
Patented Nov. 24, 1908.
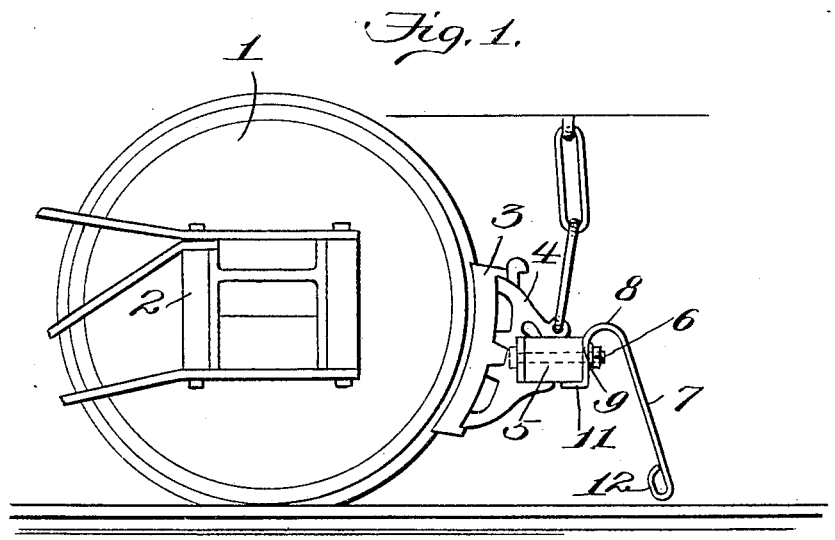
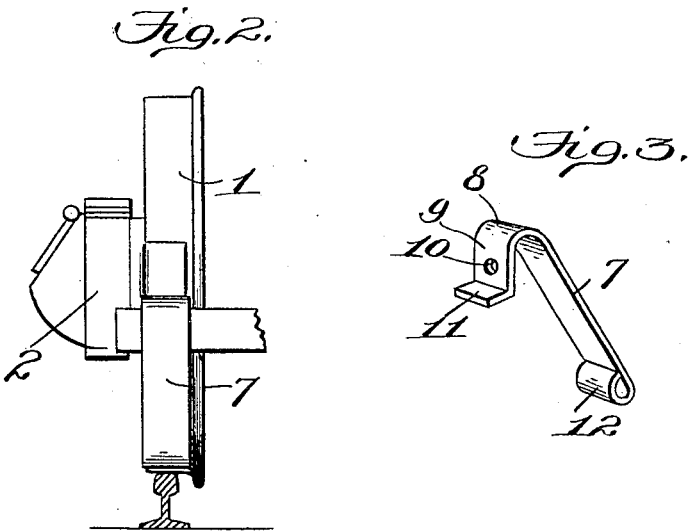
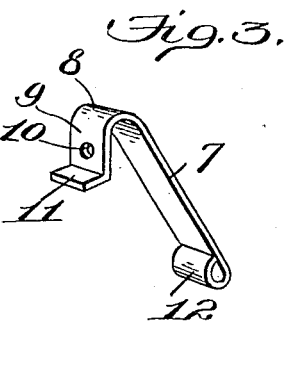
Witnesses:
Inventor
Clarence T. Moss
By James L. Norris

UNITED STATES PATENT OFFICE.

CLARENCE TANNER MOSS, OF CLINTON, IOWA.

WHEEL GUARD OR FENDER.

No. 904,980.  Specification of Letters Patent.  Patented Nov. 24, 1908.

Application filed May 5, 1908. Serial No. 431,070.

*To all whom it may concern:*

Be it known that I, CLARENCE TANNER MOSS, a citizen of the United States, residing at Clinton, in the county of Clinton and State of Iowa, have invented new and useful Improvements in Wheel Guards or Fenders, of which the following is a specification.

My present invention relates to improvements in guards or fenders adapted for use in connection with car wheels, and it has for its object primarily to provide a simple and improved device of this character which may be readily and cheaply attached to the running gear or wheel of the vehicle, it being generally preferable to attach it to the brake beam by means of a bolt or equivalent device which may be found in use on all brake beams, such for instance, as the bolt which extends through the beam and serves to secure the usual brake head thereto, the guard or fender when thus applied, occupying such a position with reference to the brake beam and wheel as not to interfere with the location and operation of the brake shoes, and serving in practice to effectually remove objects or obstructions of various kinds from the track in order to prevent the car wheels from passing over them.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a side elevation of a portion of a car truck equipped with a wheel guard or fender constructed in accordance with my present invention; Fig. 2 represents an end view of a portion of the truck showing the guard or fender in front elevation; and Fig. 3 is a perspective view of the guard or fender detached.

Similar parts are designated by the same reference characters in the several views.

Wheel guards or fenders constructed in accordance with my present invention are capable of use generally in connection with vehicles of various kinds, the present embodiment thereof being especially adapted for use in connection with railway cars, the guard or fender being suitably secured in advance of the car wheel and in such a position with reference to the track as to engage any object or obstruction resting thereon and thus remove it in order to prevent the car wheels from passing over it. It may serve to remove a body of a person from the track in order to prevent injury thereto, and it will also serve to remove stones or other objects from the track which, should the wheel pass over them, might cause a derailing of the car.

I have shown the invention as applied to a railway car truck in the present instance, the wheel 1 being journaled as usual in the truck frame 2, and a brake shoe 3 is mounted to coöperate with the wheel as usual. This brake shoe is secured in the present instance to a brake head 4, the latter fitting the inner side of the usual transverse brake beam 5, a bolt 6 extending through the beam from the rear side thereof and serving to secure the brake head thereon.

The guard or fender shown in the present embodiment of my invention consists of a strip of metal 7, preferably resilient, and formed of flat stock in order that it may yield flatwise of the metal under the pressure of an object bearing against it, although it will resist lateral pressure tending to displace it from a position above the rail. The upper end of the strip is doubled or bent flatwise of the metal to form a resilient loop 8, the rear arm of the loop being extended perpendicularly to form a shank 9 which is adapted to bear against the vertical side of the brake beam immediately in rear of the brake head, this attaching shank being provided with an aperture 10 through which the bolt 6 which locks the brake head passes, the nut or head on this bolt bearing against the rear side of the attaching shank and thereby serving to securely fasten it in position. In order to further secure the guard or fender, the lower end of the attaching shank 9 is preferably bent at right angles to form a flange 11 which is adapted to extend under the brake beam and coöperate with the lower side thereof, this flange together with the attaching shank 9 providing an angular shaped socket into which the lower corner or edge of the brake beam rests. The body portion of the guard or fender preferably inclines slightly in a direction from the brake beam, and its lower end extends to a position just above the top of the rail, a suitable space being provided for clearance. In order to avoid a sharp corner or edge at the lower end of the guard or fender, its lower end is preferably rolled or rounded as at 12, this rounded portion presenting a smooth surface to objects of various kinds so as to prevent them from catching on the lower end of the guard. By making the guard of resilient and flat material, the guard is capable of bending or yielding in striking an object so as to thereby relieve the shock and prevent breakage of the guard, and as the greatest thickness of the guard is presented in a direction transversely of the track, the guard is capable of resisting forces tending to displace it from a position above the rail.

A wheel guard or fender constructed in accordance with my present invention is very simple in construction so that it may be manufactured cheaply and is not liable to get out of order, and in practice it is capable of being interchangeably and universally applied to cars of various constructions, as it is adapted for attachment directly to the brake beam and it may be quickly applied and secured by utilizing a bolt or equivalent part which is found on all brake beams, such for instance, as the bolt which secures the brake head to the beam, this bolt, of course, being arranged in a position immediately above the rail.

I claim as my invention:

1. The combination of a brake beam, a brake head mounted at one side thereof, a wheel guard mounted at the opposite side of said beam, and a device for securing both the brake head and wheel guard to the brake beam.

2. A wheel guard or fender comprising a strip of flat resilient metal provided with a downwardly inclined body portion, the upper portion being doubled flatwise of the metal and forming a downwardly extending attaching shank adapted to be secured to a brake beam, and a brake head securing bolt serving to attach said guard to the brake beam.

3. A wheel guard or fender comprising a strip of flat resilient metal having a body portion inclined downwardly, its upper portion being doubled flatwise of the metal to form a loop opening downwardly, one arm of the loop extending perpendicularly and having its lower end extended horizontally at right angles thereto to form an angular socket adapted to receive a portion of a brake beam.

4. In a device of the class described, the combination with a brake beam provided with a brake head, and a bolt for securing the brake head to the beam, of a fender composed of a strip of metal having a downwardly inclined body portion, the upper portion being doubled to form a loop, and one arm of the loop being extended vertically to engage the rear side of the brake beam behind the brake head, said arm being provided with an aperture to receive the bolt which secures the brake head.

5. In a device of the class described, the combination with a brake beam having a brake head thereon, and a bolt extending through the brake beam for securing the head thereto, of a wheel guard or fender comprising a strip of flat resilient metal having a portion inclined downwardly so as to rest immediately above the rail, the upper portion being doubled flatwise of the metal to form a resilient loop opening downwardly, and an arm of the loop being extended vertically to engage the back of the brake beam in rear of the brake head and provided with an aperture to receive the said bolt, the lower end of the attaching arm being extended at right angles thereto to form a flange which coöperates with the under side of the brake beam.

In testimony whereof I have hereunto set my hand in presence of two subscribing witnesses.

CLARENCE TANNER MOSS.

Witnesses:
ELLA F. GRIMES,
M. W. BARRY.